(12) United States Patent
Kawajiri et al.

(10) Patent No.: US 8,944,757 B2
(45) Date of Patent: Feb. 3, 2015

(54) FLUID MACHINE

(75) Inventors: Hideyuki Kawajiri, Yokohama (JP);
Naritoshi Nakagawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 523 days.

(21) Appl. No.: 13/229,359

(22) Filed: Sep. 9, 2011

(65) Prior Publication Data
US 2012/0063889 A1 Mar. 15, 2012

(30) Foreign Application Priority Data

Sep. 13, 2010 (JP) ................................ P2010-204824
Jul. 25, 2011 (JP) ................................ P2011-162187

(51) Int. Cl.
*F04D 29/08* (2006.01)
*F03B 3/02* (2006.01)
*F03B 11/00* (2006.01)
*F16J 15/44* (2006.01)

(52) U.S. Cl.
CPC ................. *F03B 3/02* (2013.01); *F03B 11/006* (2013.01); *F16J 15/44* (2013.01); *Y02E 10/223* (2013.01); *Y02E 10/226* (2013.01)
USPC ..................................................... 415/173.6

(58) Field of Classification Search
CPC ....... F01D 11/08; F04D 29/32; F03B 11/006; F03B 3/02; F16J 15/44
USPC ............. 415/171.1, 172.1, 173.1, 173.6, 230, 415/173.5; 277/399, 400, 411, 412, 418, 277/424
See application file for complete search history.

(56) References Cited

U.S. PATENT DOCUMENTS

| | | | |
|---|---|---|---|
| 4,049,361 A | | 9/1977 | Chacour |
| 4,721,313 A | * | 1/1988 | Pennink ........................ 277/412 |
| 4,976,444 A | * | 12/1990 | Richards ........................ 277/412 |
| 5,190,440 A | * | 3/1993 | Maier et al. ................ 415/174.5 |
| 7,222,861 B2 | | 5/2007 | Gittler |
| 8,454,025 B2 | * | 6/2013 | Donovan et al. .............. 277/559 |
| 2008/0080972 A1 | | 4/2008 | Bunker |

FOREIGN PATENT DOCUMENTS

| | | |
|---|---|---|
| CN | 101153545 A | 4/2008 |
| DE | 10 2007 046 252 A1 | 4/2008 |

(Continued)

OTHER PUBLICATIONS

Okamura, Seal device for hydraulic equipment, Jul. 5, 1989, Abstract of JP1-170765 A.*

(Continued)

*Primary Examiner* — Liam McDowell
(74) *Attorney, Agent, or Firm* — Finnegan, Henderson, Farabow, Garrett & Dunner, L.L.P.

(57) ABSTRACT

A fluid machine of an embodiment includes a sealing portion formed of an annular minute gap between a runner band of a runner configuring a rotating portion and a sealing liner which is a stationary portion and arranged in opposition to the runner band. A groove having a quadrangular cross-sectional shape is formed circumferentially on a surface of the sealing liner configuring the sealing portion. In a cross section perpendicular to a groove forming direction of the groove, an angle θ, formed between a side WU of the groove on the most upstream side with respect to the flowing direction of the leakage flow and a side W0 of the groove which is on an extended line of the surface of the sealing liner, is determined to be 15° or more and 40° or less.

15 Claims, 16 Drawing Sheets

(56) References Cited

FOREIGN PATENT DOCUMENTS

| | | | |
|---|---|---|---|
| JP | 54-53145 | | 4/1979 |
| JP | 54-142439 | | 11/1979 |
| JP | 56-135799 | | 10/1981 |
| JP | 1-170765 A | * | 7/1989 |
| JP | 2004-360687 | | 12/2004 |
| JP | 2006-052808 | | 2/2006 |
| JP | 2011-122472 | | 6/2011 |

OTHER PUBLICATIONS

Patent Examination Report No. 1 issued by the Australian Patent Office on Dec. 7, 2012, for Australian Patent Application No. 2011213756.

Hideo, O. et al., "Handbook of Hydraulic Machinery," Asakara Publishing, 8 sheets including p. 647, (1998).

Notice of Reasons for Refusal, Issued by Japanese Patent Office for Application JP 2011-162187, Sep. 16, 2014, and English translation, 8 pages.

* cited by examiner

FLUID MACHINE

CROSS-REFERENCE TO RELATED APPLICATIONS

This application is based upon and claims the benefit of priority from Japanese Patent Application No. 2010-204824, filed on Sep. 13, 2010 and Japanese Patent Application No. 2011-162187, filed on Jul. 25, 2011; the entire contents of which are incorporated herein by reference.

FIELD

Embodiments described herein relate generally to a fluid machine such as a Francis-type turbine and a Francis-type pump-turbine.

BACKGROUND

As a fluid machine, there are, for example, types such as a hydro turbine, a pump and the like. For example, the fluid machine such as a Francis-type turbine has a rotating portion and a stationary portion, so that there occurs a leakage flow that is part of the working fluid flowing through the gap between them. The leakage flow does not perform energy exchange with a prime mover within the fluid machine, and a leakage loss is caused depending on a flow rate of the leakage flow. Therefore, to reduce the flow rate of the leakage flow as small as possible, a seal structure formed of a minimum gap is adopted in the vicinity of the inlet and outlet of the fluid machine.

In addition to the structure configured of only the minimum gap, this seal structure includes a structure that the passage is narrowed by forming a projection of a rectangular shape, a saw-tooth shape or a thread shape from, for example, a sealing surface of the stationary portion, at a part of the gap between the stationary portion and the rotating portion configuring a sealing portion, and a structure that the sealing portion is formed to have multiple stages.

The hydro turbine such as a Francis-type turbine uses river water containing earth and sand as a working fluid. Therefore, for example, a conventional seal structure that a passage is narrowed by forming a projection from a sealing surface of the stationary portion suffers from abrasion of the tip end of the projection due to river water containing earth and sand, resulting in a possibility that a sealing effect is deteriorated, and a flow rate of the leakage flow of the working fluid (river water) increases.

DETAILED DESCRIPTION

In one embodiment, a sealing portion formed of an annular minute gap is provided between a rotating portion which is provided with a plurality of blades and an annular member disposed circumferentially at one ends of the blades and a stationary portion which is arranged in opposition to the annular member. A groove portion having a cross-sectional shape of an n-angled shape (n=3 or more) is circumferentially formed on a wall portion of the annular member or the stationary portion which configures the sealing portion. And, an angle θ, which is formed between a side W0 of the groove portion on an extended line of a wall surface of the wall portion and a side WU of the groove portion on the most upstream side with respect to a flowing direction of a leakage flow, is 15° or more and 40° or less in a cross section perpendicular to a groove forming direction of the groove portion.

Embodiments of the invention are described below with reference to the drawings.

(First Embodiment)

Figure 1:
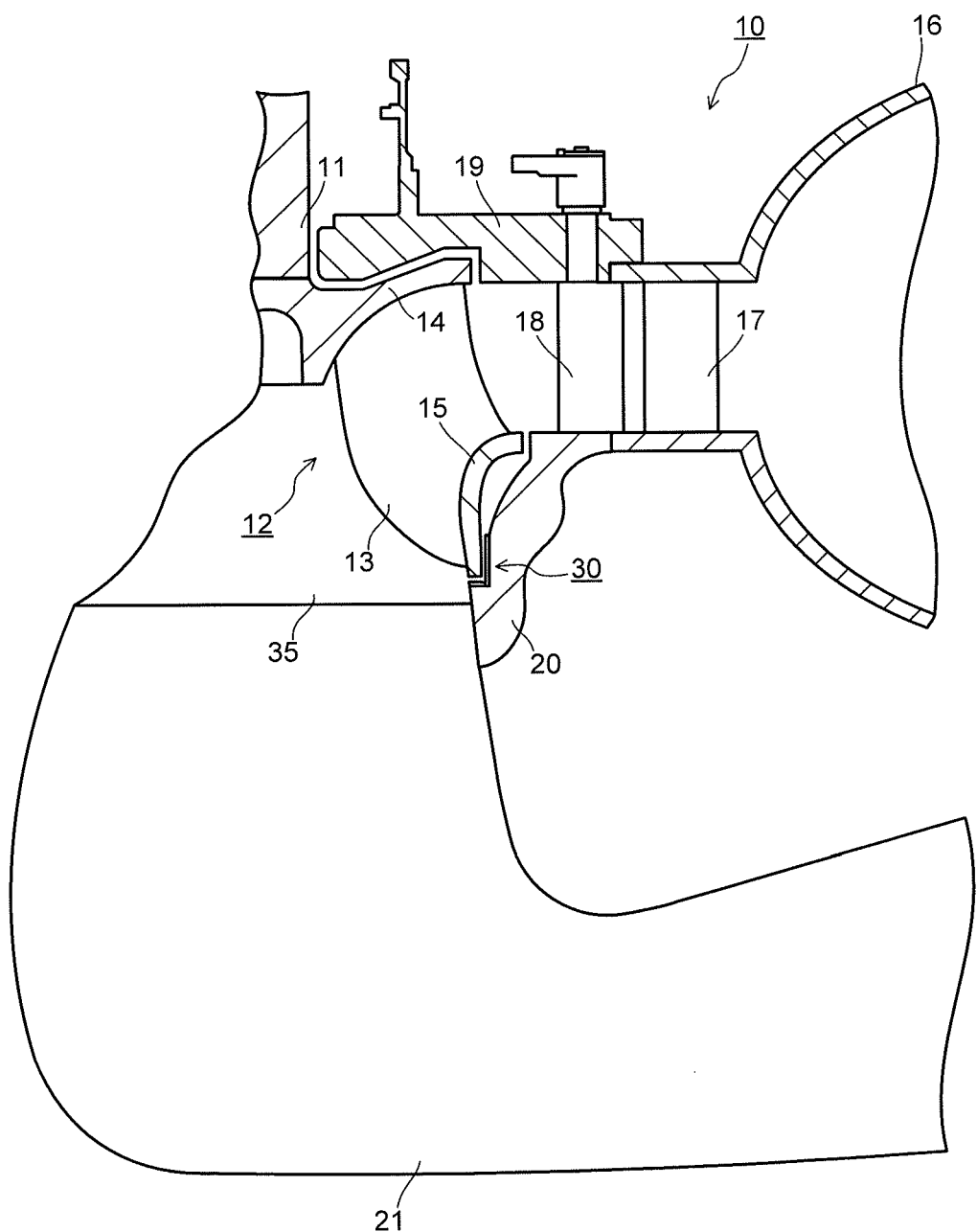
FIG. 1 is a view showing a part of the hydro turbine of a first embodiment in a meridional cross section.

FIG. 1 is a view showing a part of a hydro turbine 10 of a first embodiment in a meridional cross section. As an example of the hydro turbine 10 which functions as a fluid machine, a Francis-type turbine is described below. Like component parts in the following embodiments are denoted by like reference numerals, and overlapped descriptions will be omitted or simplified.

As shown in FIG. 1, a Francis-type runner 12 is connected to the bottom end of a main shaft 11 of the hydro turbine 10. An unshown generator is connected to the top of the main shaft 11. The runner 12 includes plural runner blades 13 which are arranged at prescribed intervals circumferentially, a disc-shaped crown 14 which fixes the runner blades 13 from their one sides, and a runner band 15 which functions as an annular member to fix the runner blades 13 from the other sides. And, the crown 14 is connected to the main shaft 11.

A casing 16 is arranged on an outer periphery of the runner 12, and plural stay vanes 17 are arranged in a circumferentially on an inner peripheral portion of the casing 16. And, plural guide vanes 18 are arranged circumferentially between the stay vanes 17 and the runner 12.

A cover 19 is disposed above the runner 12, and a discharge ring 20 is disposed below the runner 12. In addition, a draft tube 21, which is connected to the discharge ring 20, is disposed below the runner 12.

A seal structure is configured between the runner band 15 of the runner 12 configuring a rotating portion and a stationary portion such as the discharge ring 20 disposed in opposition to the runner band 15 to surround the runner band 15.

The seal structure is described below.

Figure 2:
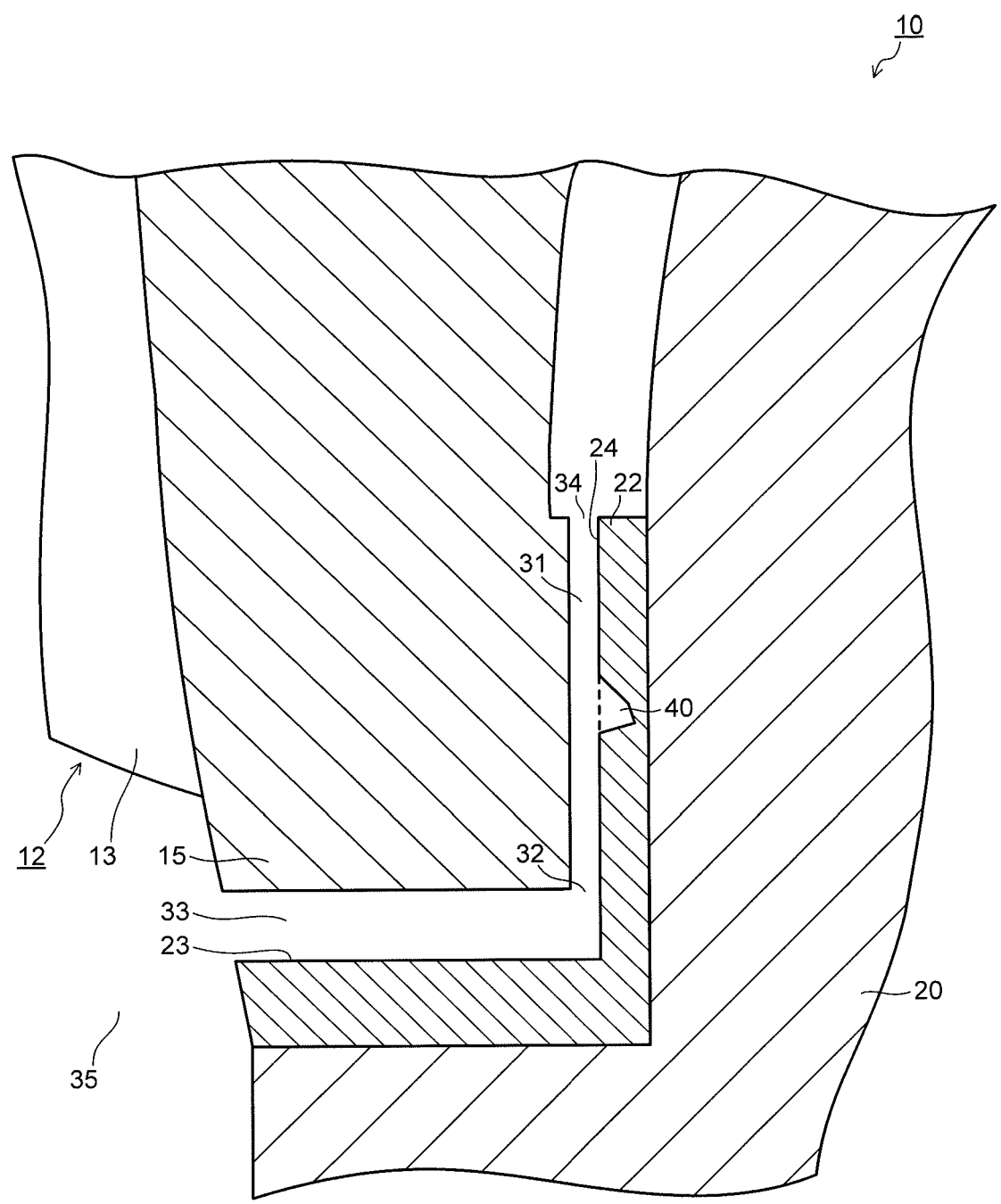
FIG. 2 is a view showing a meridional cross section of a seal structure provided to the hydro turbine of the first embodiment.
Figure 3:
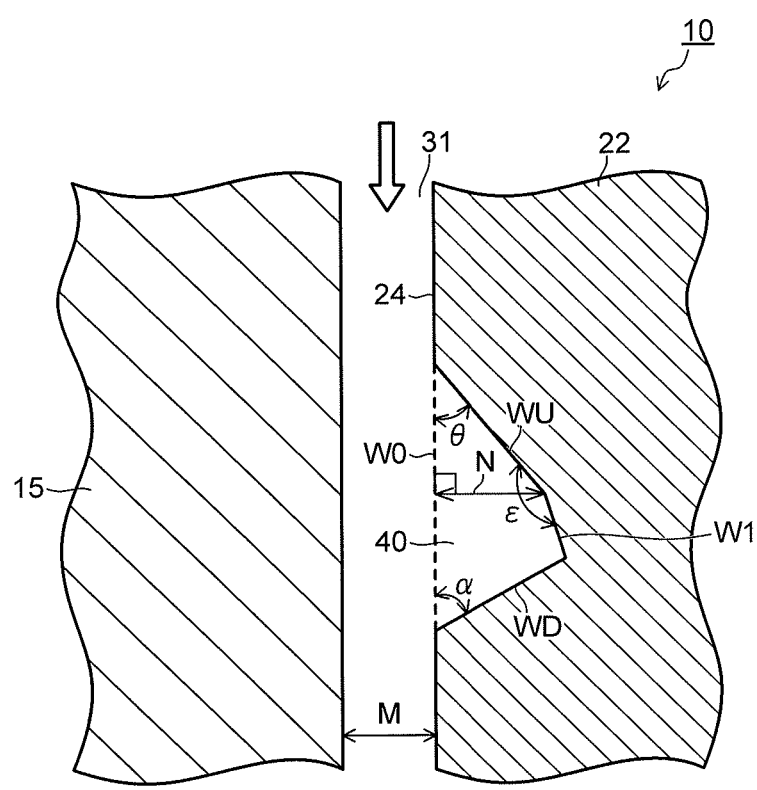
FIG. 3 is a view of a meridional cross section showing in a magnified fashion a groove portion of the seal structure provided to the hydro turbine of the first embodiment.
Figure 4:
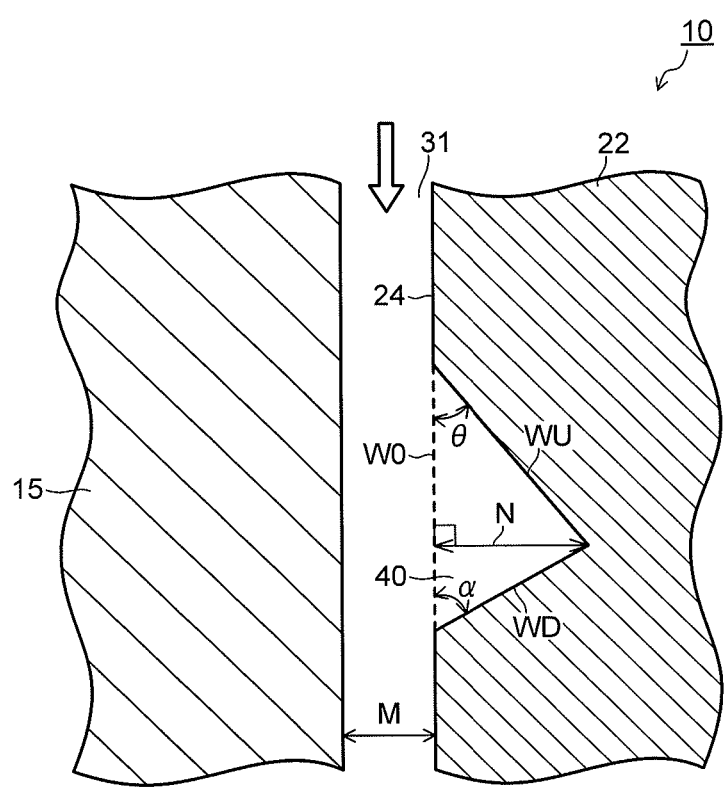
FIG. 4 is a view of a meridional cross section showing in a magnified fashion another shape of the groove portion of the seal structure provided to the hydro turbine of the first embodiment.

FIG. 2 is a view showing a meridional cross section of the seal structure provided to the hydro turbine 10 of the first embodiment. FIG. 3 is a view of a meridional cross section showing in a magnified fashion a groove portion of the seal structure provided to the hydro turbine 10 of the first embodiment. FIG. 4 is a view of a meridional cross section showing in a magnified fashion another shape of the groove portion of the seal structure provided to the hydro turbine 10 of the first embodiment.

As shown in FIG. 2, a sealing portion 31 which is formed of an annular minute gap and an annular gap portion 33 which is communicated with a main passage 35 and allows to flow a main flow bent at right angles from an outlet 32 of the sealing portion 31 are configured between the runner band 15 and a sealing liner 22 which is a stationary portion formed on a surface of the discharge ring 20 so as to be opposite to the runner band 15. The annular gap portion 33 is bent at right angles from the outlet 32 of the sealing portion 31 here but it is determined that the bent angle (bent angle of the portion whose surface is bent into an L shape in the sealing liner 22 shown in FIG. 2) includes a range of 60 to 120°. The bent angle is determined to fall in the above range because, for example, a vertical axis-type Francis-type turbine has a possibility of placing the runner 12 on a surface 23 of the sealing liner 22 configuring the gap portion 33 at the time of assembling and disassembling, and if the bent angle is not in the above range, it is difficult to place the runner 12 on the surface 23, and it is not realistic.

As shown in FIG. 2 and FIG. 3, a horizontal annular groove 40 is formed circumferentially on a surface 24 of the sealing liner 22 configuring the sealing portion 31. Thus, the groove 40 is positioned between an inlet 34 and the outlet 32 of the sealing portion 31.

The groove 40 has a quadrangular shape in a meridional cross section perpendicular to the formed direction of the groove 40. The shape of the groove 40 in the meridional cross section is not limited to the quadrangular shape but may be an n-angled shape (n=3 or more) such as a triangle shape, a pentagonal shape or the like. FIG. 4 shows a case that the groove 40 in a meridional cross section is triangle.

As shown in the meridional cross section of FIG. 3, it is determined that an angle θ formed between a side WU of the groove 40, which is on the most upstream side with respect to a flowing direction of a leakage flow (direction of the arrow shown in FIG. 3), and a side W0 of the groove 40, which is on an extended line of the surface 24 of the sealing liner 22, is in a range of 15° or more and 40° or less.

When it is configured to have the angle θ in the range of 15° or more and 40° or less, a passage cross-sectional area expands moderately while the leakage flow which has flown into the sealing portion 31 flows through a passage cross section of the sealing portion 31 where the groove 40 is formed. Therefore, the leakage flow does not separate from the wall surface equivalent to the side WU but expands while being decelerated along the wall surface, and part of the leakage flow having flown into the groove 40 suffers loss due to collision, friction with the wall surface and the like. Meanwhile, when the angle θ is less than 15°, the depth of the groove 40 is small, and the above-described effect is not exerted. And, when the angle θ exceeds 40°, the leakage flow flows without flowing into the groove 40.

In the meridional cross section, it is preferable to configure that an angle α which is formed between a side WD of the groove 40 on the most downstream side with respect to the flowing direction of the leakage flow and the side W0 is 90° or less. When the angle α exceeds 90°, a stagnation region is formed in the vicinity of an end portion where the wall surface equivalent to the side WD and the wall surface equivalent to a side W1 adjacent to the side WD are contacted. The lower limit value of the angle α of the groove 40 is preferably about 60° in terms of configuring the length in the direction of the rotating shaft to an appropriate length.

And, when it is determined that the side WU has a length $L_{WU}$ in the meridional cross section, it is preferable that a value $L_{WU}\sin\theta$, namely a distance N (length of a straight line which intersects at right angles from one end of the side WU to the side W0) from one end of the side WU at the back of the groove to the side W0, is not less than a width M of the minute gap between the runner band 15 and the sealing liner 22. When the value $L_{WU}\sin\theta$ (distance N) is determined to be not less than the width M, a flow velocity of the leakage flow in the passage cross section of the sealing portion 31, where the groove 40 is formed, can be decelerated to about ½.

As shown in FIG. 3, when it is determined that the groove 40 in the meridional cross section has a quadrangular shape, it is preferable that the side W1 adjacent to the side WU becomes parallel to the side W0. The same is also applied when the shape of the groove 40 in the meridional cross section has an n-angled shape (n=5 or more). By configuring the wall surface equivalent to the side W1 as described above, the passage cross section of the sealing portion 31 becomes constant when the leakage flow flows along the side W1, so that the leakage flow is suppressed from separating from the wall surface equivalent to the side W1. And, the loss of the leakage flow due to the friction with the wall surface in the groove 40 can be increased. And, an angle ε formed between the side WU and the side W1 in the meridional cross section is preferably set to about 140 to 170° to make the passage cross section constant or to expand the passage cross section moderately so as to decrease the flow velocity.

Here, an end portion where a wall surface on the most upstream side of the groove 40, which is equivalent to the side WU in a meridional cross section, and the surface 24 of the sealing liner 22 adjacent to the wall surface are contacted may be formed into an arc shape (R portion). By configuring in this way, the leakage flow flowing into the groove 40 can be prevented from separating at a start position of the wall surface equivalent to the side WU. Therefore, part of the leakage flow can be flown into the groove 40 securely, and the loss in the groove 40 can be increased.

Subsequently, the action of the working fluid in the hydro turbine 10 and the sealing portion 31 is described below with reference to FIG. 1 to FIG. 3.

Pressure water which is a working fluid introduced from an upper reservoir through an iron pipe flows through the casing 16 and the stay vanes 17 and is introduced into the runner 12 through the guide vanes 18 where the flow rate is adjusted. In the runner 12, pressure energy of the introduced pressure water is converted into rotation energy. The runner 12 rotates around the main shaft 11 which is a rotating shaft, and an unshown generator coupled with the main shaft 11 is rotated to generate electricity. And, the working fluid having flown through the runner 12 is discharged to a lower reservoir on a downstream side through the draft tube 21.

Meanwhile, the leakage flow having flown between the runner band 15 and the discharge ring 20 flows into the sealing portion 31. When the leakage flow having flown into the sealing portion 31 flows through a passage cross section of the sealing portion 31 where the groove 40 is formed, a passage cross-sectional area expands moderately. Therefore, the leakage flow does not separate from the wall surface equivalent to the side WU but expands while being decelerated along the wall surface, and part of the leakage flow having flown into the groove 40 suffers loss due to collision, friction with the wall surface and the like. And, the leakage flow having flown through the passage cross section, where the groove 40 is formed, flows through the passage (minute gap of the width M between the runner band 15 and the sealing liner 22) of the sealing portion 31 whose passage cross-sectional area is decreased. At this time, the flow is narrowed down, and a loss is generated due to a contracted flow.

The leakage flow having passed through the sealing portion 31 is ejected at a high velocity from the outlet 32 of the sealing portion 31 to the gap portion 33, flown through the gap portion 33, and lead out to the main passage 35.

As described above, when the groove 40 having the above prescribed shape is formed on the wall surface of the passage configuring the sealing portion 31 according to the hydro turbine 10 of the first embodiment, the loss due to friction and the like can be increased while the leakage flow flows through the passage cross section where the groove 40 is formed. In addition, the leakage flow having flown through the passage cross section where the groove 40 is formed has the generation of loss due to the contracted flow. Thus, the leakage flow suffers the loss in the sealing portion 31, and the loss is larger than that generated when the groove 40 is not formed. Therefore, since the loss in the sealing portion 31 is large according to the hydro turbine 10 of the first embodiment, the sealing effect is high, the flow rate of the leakage flow can be reduced, and the volumetric efficiency of the hydro turbine 10 can be improved.

In the above example, the annular groove 40 which is horizontal and circumferentially formed on the surface 24 of the sealing liner 22 between the inlet 34 and the outlet 32 of the sealing portion 31 is provided in a single stage, but the groove 40 may be provided in plural stages with prescribed intervals in the direction of the rotating shaft. And, the same action and effect as those described above can be obtained.

In the above example, the groove 40 is provided on the surface 24 of the sealing liner 22 which is a stationary portion, but the groove 40 may also be formed on the surface of the runner band 15 which is a rotating portion configuring the sealing portion 31. And, the same action and effect as those described above can also be obtained.

(Second Embodiment)

A hydro turbine 100 of a second embodiment is different from the hydro turbine 10 of the first embodiment on the point that the sealing portion 31 has a different groove shape, and therefore, the groove shape only is described mainly.

Figure 5:
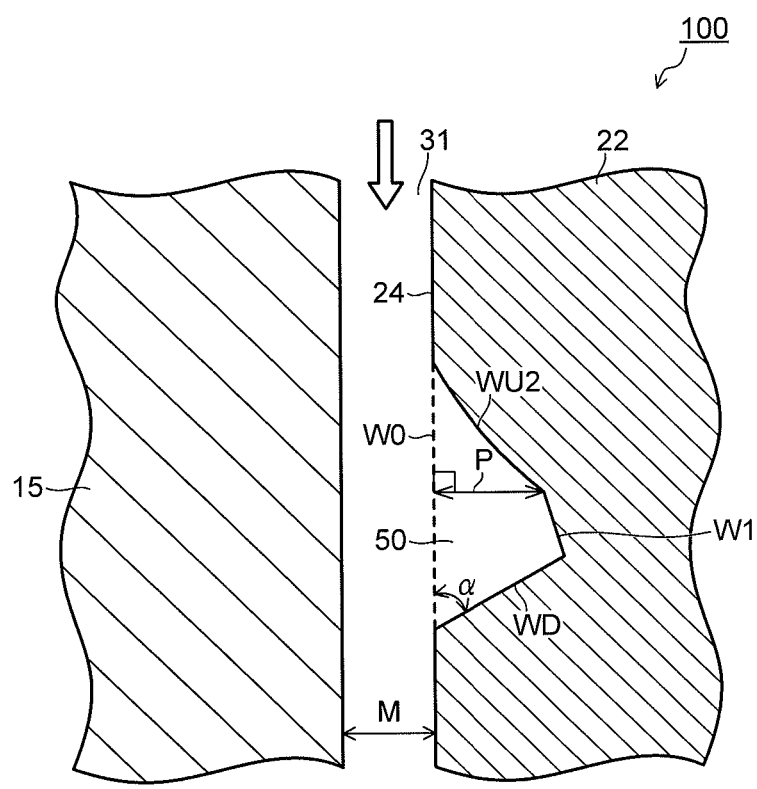
FIG. 5 is a view of a meridional cross section showing in a magnified fashion a groove portion of a seal structure provided to the hydro turbine of a second embodiment.

FIG. 5 is a view of a meridional cross section showing in a magnified fashion a groove portion of a seal structure provided to the hydro turbine 100 of the second embodiment.

Figure 6:
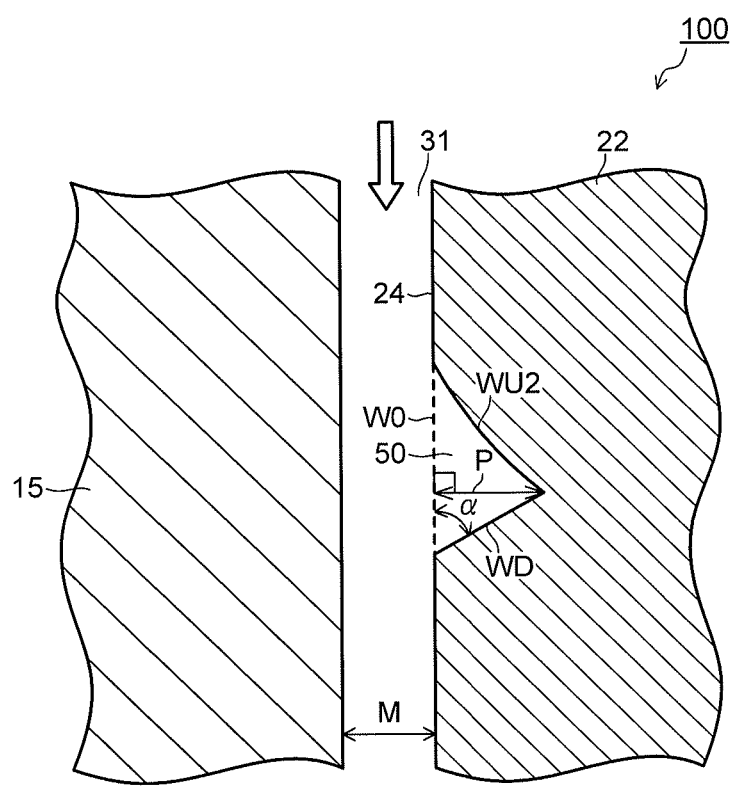
FIG. 6 is a view of a meridional cross section showing in a magnified fashion another shape of the groove portion of the seal structure provided to the hydro turbine of the second embodiment.

FIG. 6 is a view of a meridional cross section showing in a magnified fashion another shape of the groove portion of the seal structure provided to the hydro turbine 100 of the second embodiment.

As shown in FIG. 5, an annular groove 50 which is horizontal and circumferentially formed on the surface 24 of the sealing liner 22 which configures the sealing portion 31. Thus, the groove 50 is located between the inlet 34 and the outlet 32 of the sealing portion 31.

The groove 50 has in a meridional cross section a substantially quadrangular shape which has the most upstream side of the groove 50 formed into a convex curve WU2 in the flowing direction (direction of the arrow shown in FIG. 5) of the leakage flow. Thus, the second embodiment has a wall surface equivalent to the curve WU2 instead of the wall surface equivalent to the side WU of the groove 40 of the sealing portion 31 of the hydro turbine 10 of the first embodiment.

The shape of the groove 50 in the meridional cross section may be a substantially n-angled shape (n=3 or more) such as a substantially triangle shape, a substantially pentagonal shape or the like if the most upstream side has the convex curve WU2 in the flowing direction (direction of the arrow shown in FIG. 5) of the leakage flow. FIG. 6 shows that the groove 50 in a meridional cross section has a substantially triangle shape.

It is preferable that the curve WU2 has a curvature radius of not less than the width M of the minute gap between the runner band 15 and the sealing liner 22 so to moderately expand the passage cross-sectional area in the inflow portion of the groove 50.

In the meridional cross section, it is preferable that a distance P (length of a straight line which intersects at right angles from one end of the curve WU2 to the side W0) from one end of the curve WU2 at the back of the groove to the side W0 is not less than the width M of the minute gap between the runner band 15 and the sealing liner 22. When the distance P is determined to be not less than the width M, a flow velocity of the leakage flow in the passage cross section of the sealing portion 31, where the groove 50 is formed, can be decelerated to about ½.

As shown in FIG. 5, when the shape of the groove 50 in the meridional cross section is determined to have a substantially quadrangular shape, it is preferable that the side W1 adjacent to the curve WU2 becomes parallel to the side W0. The same is also applied when the shape of the groove 50 in the meridional cross section has an n-angled shape (n=5 or more). By configuring the wall surface equivalent to the side W1 as described above, the passage cross section of the sealing portion 31 becomes constant when the leakage flow flows along the side W1, so that the leakage flow is suppressed from separating from the wall surface equivalent to the side W1. And, the loss of the leakage flow due to the friction with the wall surface in the groove 50 can be increased.

As described above, since the passage cross-sectional area expands moderately at an inflow portion of the groove 50 of the hydro turbine 100 of the second embodiment, the leakage flow does not separate from the wall surface equivalent to the curve WU2 but expands while being decelerated along the wall surface. And, the part of the leakage flow having flown into the groove 50 suffers loss due to collision, friction with the wall surface and the like. Thus, the sealing effect can be enhanced by increasing the loss in the sealing portion 31 by the hydro turbine 100 of the second embodiment. Thus, the flow rate of the leakage flow can be decreased, and the volumetric efficiency of the hydro turbine 100 can be improved.

In the above example, the annular groove 50 which is horizontal and circumferentially formed on the surface 24 of the sealing liner 22 between the inlet 34 and the outlet 32 of the sealing portion 31 is provided in a single stage, but the groove 50 may be provided in plural stages with prescribed intervals in the direction of the rotating shaft. And, the same action and effect as those described above can be obtained.

In the above example, the groove 50 is provided on the surface 24 of the sealing liner 22 which is a stationary portion, but the groove 50 may be formed on the surface of the runner band 15 which is a rotating portion configuring the sealing portion 31. And, the same action and effect as those described above can also be obtained.

(Third Embodiment)

A hydro turbine 101 of a third embodiment has a groove which is formed helically on the surface 24 of the sealing liner 22 or the surface of the runner band 15, instead of the annular grooves 40 and 50 of the sealing portion 31 in the hydro turbine 10 of the first embodiment and the hydro turbine 100 of the second embodiment.

Figure 7:
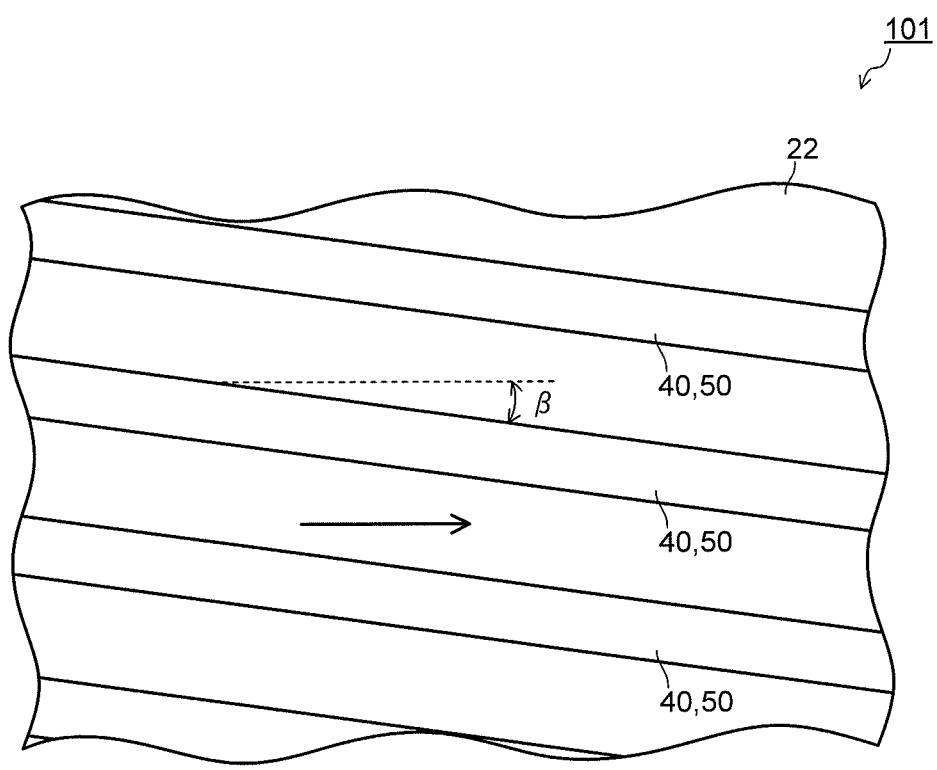
FIG. 7 is a plan development view of grooves formed on a surface of a sealing liner of the hydro turbine of a third embodiment as viewed from a runner band side.

FIG. 7 is a plan development view of the grooves formed on the surface 24 of the sealing liner 22 of the hydro turbine 101 of the third embodiment viewed from the side of the runner band 15. The arrow shown in FIG. 7 indicates a rotating direction of the rotating portion.

As shown in FIG. 7, the grooves 40 and 50 are inclined downward at an angle $\beta$ with respect to the horizontal direction and the rotating direction of the rotating portion and formed helically in the direction of the rotating shaft on the surface 24 of the sealing liner 22. The angle $\beta$ is set to be larger than 0°, and preferably set to about 10 to 45° considering an influence of the flow of the leakage flow.

The grooves 40 and 50 are appropriate when they are provided in at least one stage with prescribed intervals in the direction of the rotating shaft and may also be provided in plural stages in the direction of the rotating shaft as shown in FIG. 7.

In this example, the grooves 40 and 50 are formed on the surface 24 of the sealing liner 22, but the grooves 40 and 50 may be formed on the surface 24 of the runner band 15 which is the rotating portion. Even when the grooves 40 and 50 are formed on the surface 24 of the runner band 15, the grooves 40 and 50 are formed to incline downward at an angle $\beta$ with respect to the horizontal direction and the rotating direction of the rotating portion similar to the formation of the grooves 40 and 50 on the surface 24 of the sealing liner 22. And, the shapes of the grooves 40 and 50 are similar to those of the grooves 40 and 50 described in the above-described first and second embodiments. Namely, the shape of the groove of the third embodiment shown in a cross section perpendicular to the inclined direction (groove forming direction) of the angle $\beta$ is similar to the shapes of the grooves in the meridional cross section described in the first and second embodiments.

It is also configured that the end portions on the upstream sides of the grooves 40 and 50 are located on the side of the outlet 32 than on the side of the inlet 34 of the sealing portion 31, and the end portions on the downstream sides of the grooves 40 and 50 are located on the side of the inlet 34 than on the side of the outlet 32 of the sealing portion 31. Accordingly, the leakage flow does not flow from the upstream side of the sealing portion 31 directly into the grooves 40 and 50, while the leakage flow does not flow from the grooves 40 and 50 directly into the gap portion 33.

Here, the leakage flow flows through the sealing portion 31 while swirling due to an influence of the friction on the surface of the runner band 15. For example, when the groove 40 is formed horizontally as in the first embodiment, the real angle of the leakage flow with respect to a side W0 becomes not more than the angle θ of the side WU with respect to the side W0 of the groove 40 when viewed along the flowing direction of the leakage flow. And, when the groove 40 is formed to incline downward at the angle $\beta$ with respect to the horizontal direction and the rotating direction of the rotating portion as in the third embodiment, the real angle of the leakage flow with respect to the side W0 becomes smaller than the angle in the case that the above-described groove 40 is formed horizontally. Therefore, when the leakage flow flows into the grooves 40 and 50, it does not separate from the wall surface equivalent to the side WU and the curve WU2 but expands while being decelerated along the wall surface. And, part of the leakage flow having flown into the grooves 40 and 50 suffers loss due to collision, friction with the wall surface and the like. Thus, the sealing effect can be enhanced by increasing the loss in the sealing portion 31 by the hydro turbine 101 of the third embodiment. Therefore, the flow rate of the leakage flow can be decreased, and the volumetric efficiency of the hydro turbine 101 can be improved.

(Fourth Embodiment)

A hydro turbine 102 of a fourth embodiment has a groove on the surface 24 or the sealing liner 22 or the surface of the runner band 15 in the direction of the rotating shaft.

Figure 8:
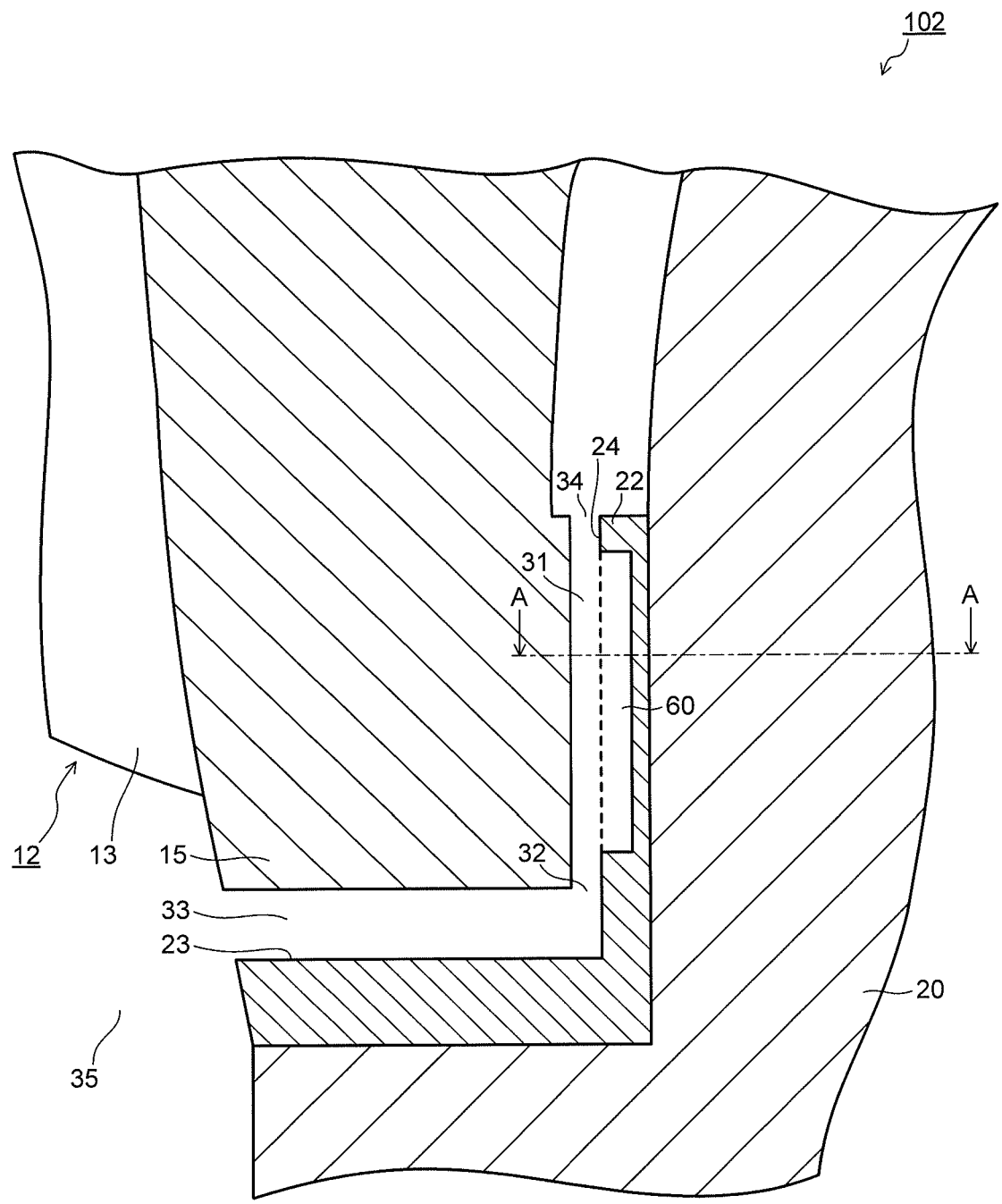
FIG. 8 is a view showing a meridional cross section of a seal structure provided to the hydro turbine of a fourth embodiment.
Figure 9:
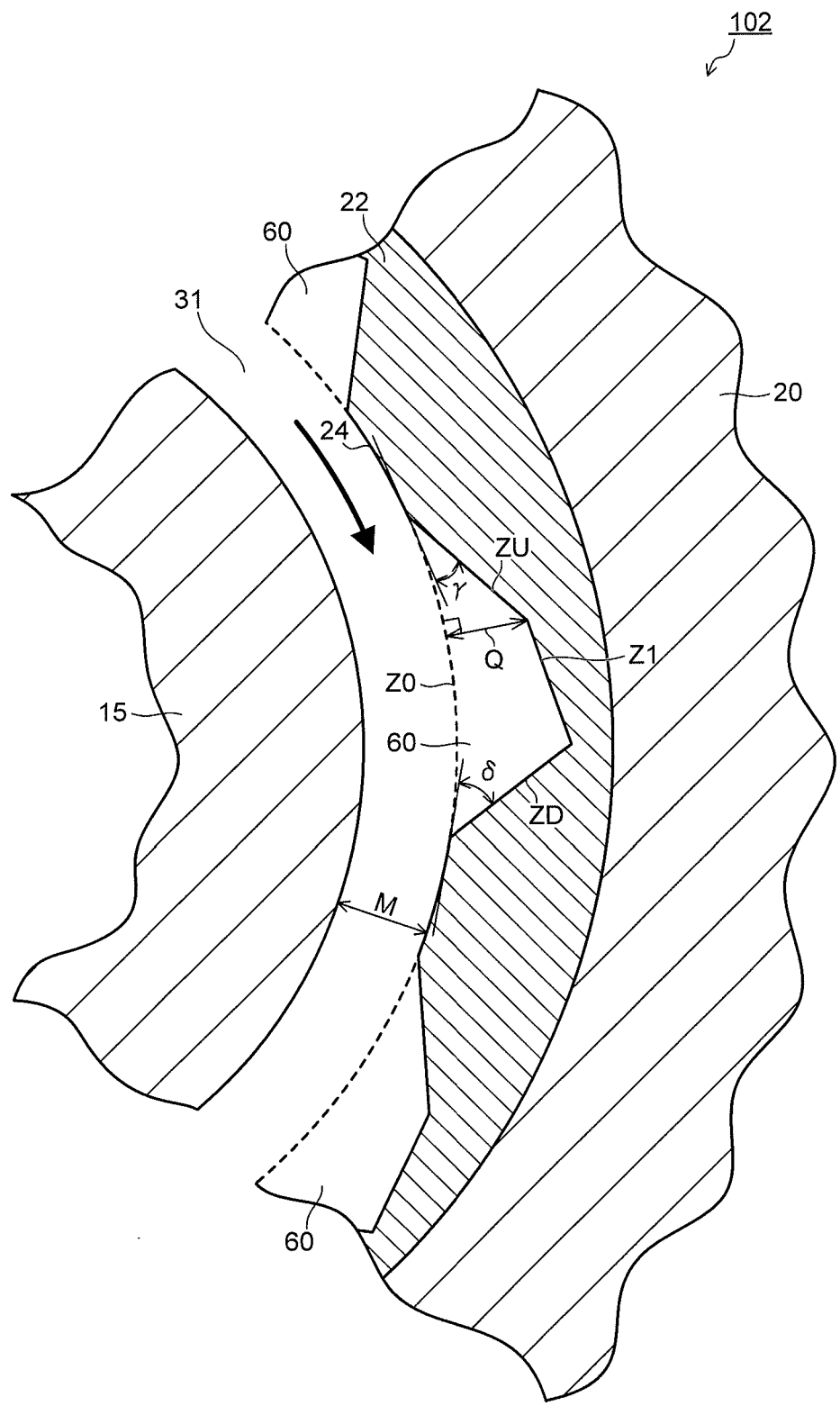
FIG. 9 is a view showing a part of cross section A-A of FIG. 8.

FIG. 8 is a view showing a meridional cross section of a seal structure provided to the hydro turbine 102 of the fourth embodiment according to the invention. FIG. 9 is a view showing a part of cross section A-A of FIG. 8.

As shown in FIG. 8 and FIG. 9, the sealing portion 31 formed of an annular minute gap and the annular gap portion 33, where the main stream bent at right angles from the outlet 32 of the sealing portion 31 flows and which is communicated with the main passage 35, are configured between the runner band 15 of the runner 12 configuring the rotating portion and the sealing liner 22 as the stationary portion which is arranged on a surface of the discharge ring 20 so as to be opposite to the runner band 15.

And, a groove 60 is formed in the direction of the rotating shaft on the surface 24 of the sealing liner 22 configuring the sealing portion 31. As shown in FIG. 8, it is configured that the end portion on the upstream side of the groove 60 is located on the side of the outlet 32 than on the side of the inlet 34 of the sealing portion 31, and the end portion on the downstream side of the groove 60 is located on the side of the inlet 34 than on the side of the outlet 32 of the sealing portion 31. Thus, the leakage flow does not flow from the upstream side of the sealing portion 31 directly into the groove 60, while the leakage flow does not flow from the groove 60 directly into the gap portion 33.

As shown in FIG. 9, the groove 60 has a substantially quadrangular shape that is formed to have a curve Z0 along the surface 24 of the sealing liner 22 and three sides ZU, ZD and Z1 in a horizontal cross section. The shape of the groove 60 in the horizontal cross section is not limited to the substantially quadrangular shape but may be substantially triangle which is formed to have the curve Z0 and two sides ZU and ZD, or substantially polygon which is formed to have the curve Z0 and four or more sides. And, the groove 60 is appropriate when at least one is formed circumferentially and may be provided circumferentially in plural with prescribed intervals as shown in FIG. 9.

As shown in the horizontal cross section of FIG. 9, it is configured that an angle γ, which is formed between the side ZU of the groove 60 on the most upstream side with respect to the flowing direction (direction of the arrow in FIG. 9) of the leakage flow and a tangent to the curve Z0 at an intersection of the end portion on the upstream side of the side ZU with the curve Z0, is in a range of 15° or more and 40° or less.

When it is configured that the angle γ is in a range of 15° or more and 40° or less, the passage cross-sectional area expands moderately while the leakage flow having flown into the sealing portion 31 flows through the passage cross section of the sealing portion 31 where the groove 60 is formed. Therefore, the leakage flow does not separate from the wall surface equivalent to the side ZU but expands while being decelerated along the wall surface, and part of the leakage flow having flown into the groove 60 suffers loss due to collision, friction with the wall surface and the like. When the angle γ is less than 15°, the depth of the groove 60 is small, and the above-described effect is not exerted. And, when the angle γ exceeds 40°, the leakage flow flows through without entering the groove 60.

And, in the groove 60 of the horizontal cross section, it is preferable to configure that an angle δ, which is formed between the side ZD on the most downstream side with respect to the flowing direction of the leakage flow and a tangent to the curve Z0 at an intersection of the end portion at the downstream side of the side ZD and the curve Z0, becomes 90° or less. When the angle δ exceeds 90°, a stagnation region is formed in the vicinity of the end portion where the wall surface equivalent to the side ZD and the wall surface equivalent to the side Z1 adjacent to the side ZD are contacted. It is preferable that the lower limit value of the angle δ is determined to be about 60° from the viewpoint that the length (namely, length equivalent to the curve Z0) of the groove 60 in a circumferential direction is determined to be appropriate.

When the length of the side ZU is determined to be $L_{ZU}$ in the horizontal cross section, it is preferable that a length Q of the normal line drawn from one end of the side ZU at the back of the groove to the curve Z0 is not less than the width M of the minute gap between the runner band 15 and the sealing liner 22. When the length Q of the normal line is determined to be not less than the width M, a flow velocity of the leakage flow in the passage cross section of the sealing portion 31, where the groove 60 is formed, can be decelerated to about ½.

When the shape of the groove 60 in the horizontal cross section is determined to be a substantially quadrangular shape, the side Z1 adjacent to the side ZU may be formed as a curve which becomes concentric with the curve Z0. By configuring in this way, when the leakage flow flows along the curve which becomes concentric with the curve Z0, the passage cross section of the sealing portion 31 becomes constant, and the leakage flow is suppressed from separating from the wall surface equivalent to this curve. And, the loss of the leakage flow due to the friction with the wall surface in the groove 60 can be increased.

Here, an end portion where a wall surface on the most upstream side of the groove 60, which is equivalent to the side ZU in a horizontal cross section, and the surface 24 of the sealing liner 22 adjacent to the wall surface are contacted may be formed into an arc shape (R portion). By configuring in this way, the leakage flow flowing into the groove 60 can be prevented from separating at a start position of the wall surface equivalent to the side ZU. Therefore, part of the leakage flow can be flown into the groove 60 securely, and the loss in the groove 60 can be increased.

As described above, when the groove 60 having the above prescribed shape is formed on the wall surface of the passage configuring the sealing portion 31 according to the hydro turbine 102 of the fourth embodiment, the loss due to friction and the like can be increased while the leakage flow flows through the passage cross section where the groove 60 is formed. In addition, the leakage flow having flown through the passage cross section where the groove 60 is formed has the generation of loss due to the contracted flow. Thus, the leakage flow suffers the loss in the sealing portion 31, and the loss is larger than that generated when the groove 60 is not formed. Therefore, since the loss in the sealing portion 31 is large according to the hydro turbine 102 of the fourth embodiment, the sealing effect is high, the flow rate of the leakage flow can be decreased, and the volumetric efficiency of the hydro turbine 102 can be improved.

In the above example, the groove 60 is provided on the surface 24 of the sealing liner 22 which is a stationary portion, but the groove 60 may be formed on the surface of the runner band 15 which is a rotating portion configuring the sealing portion 31. And, in the example here, a groove 60 is configured to have a continuous groove structure along the direction of the rotating shaft, but the groove 60 may be provided intermittently along the direction of the rotating shaft, namely, plural grooves 60 may be provided with prescribed intervals along the direction of the rotating shaft. In the above examples, the same action and effect as those described above can also be obtained.

(Fifth Embodiment)

A hydro turbine 103 of a fifth embodiment is different from the hydro turbine 102 of the fourth embodiment on the point that the sealing portion 31 has a different groove shape. Therefore, the groove shape is mainly described below.

Figure 10:
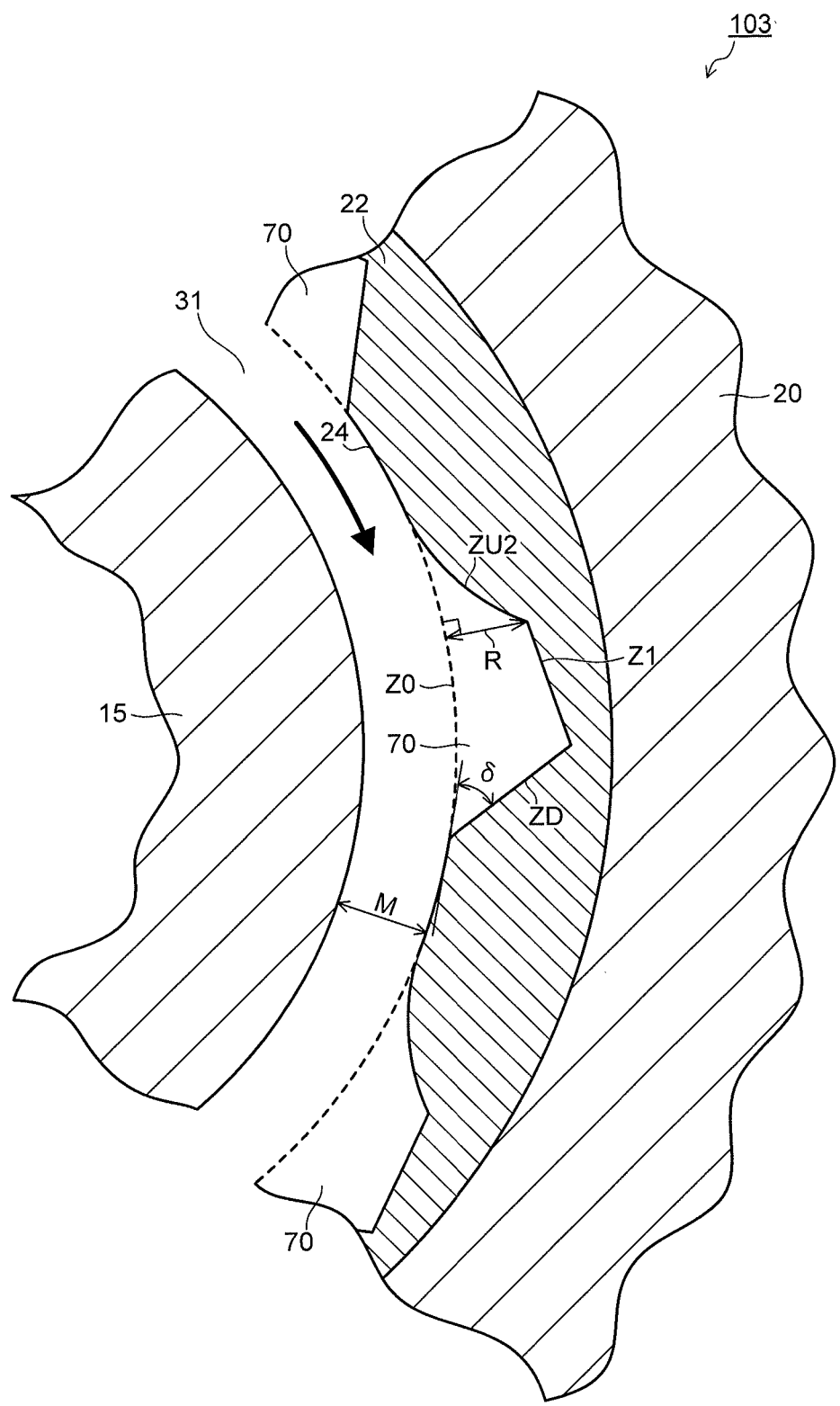
FIG. 10 is a view showing a horizontal cross section of a part of a groove portion of a seal structure provided to the hydro turbine of a fifth embodiment.

FIG. 10 is a view showing a horizontal cross section of a part of a groove portion of a seal structure provided to the hydro turbine 103 of the fifth embodiment.

As shown in FIG. 10, grooves 70 are formed along the direction of the rotating shaft on the surface 24 of the sealing liner 22 configuring the sealing portion 31. And, it is configured that the end portion on the upstream side of the groove 70 is located on the side of the outlet 32 (See FIG. 8) than on the side of the inlet 34 (See FIG. 8) of the sealing portion 31, and the end portion on the downstream side of the groove 70 is located on the side of the inlet 34 than on the side of the outlet 32 of the sealing portion 31.

The groove 70 in the horizontal cross section has a substantially quadrangular shape which has its most upstream side formed of a convex curve ZU2 with respect to the flowing direction (direction of the arrow shown in FIG. 10) of the leakage flow in the groove 70. Thus, the fifth embodiment has a wall surface equivalent to the curve ZU2 instead of the wall surface equivalent to the side ZU of the groove 60 of the sealing portion 31 of the hydro turbine 102 of the fourth embodiment.

The shape of the groove 70 in the horizontal cross section may be a substantially triangle shape, a substantially pentagonal shape or the like if the most upstream side has the convex curve ZU2 in the flowing direction (direction of the arrow shown in FIG. 10) of the leakage flow.

It is preferable that the curve ZU2 has a curvature radius of not less than the width M of the minute gap between the runner band 15 and the sealing liner 22 so to expand moderately the passage cross-sectional area at the inflow portion of the groove 70.

In the horizontal cross section, it is preferable that a length R of a normal line drawn from one end of the curve ZU2 at the back of the groove to the curve Z0 is not less than the width M of the minute gap between the runner band 15 and the sealing liner 22. When the length R of the normal line is determined to be not less than the width M, a flow velocity of the leakage flow in the passage cross section of the sealing portion 31, where the groove 70 is formed, can be decelerated to about ½.

When the groove 70 in the horizontal cross section is determined to have a substantially quadrangular shape, the side Z1 adjacent to the curve ZU2 may be formed as a curve which becomes concentric with the curve Z0. By configuring in this way, when the leakage flow flows along the curve which becomes concentric with curve Z0, the passage cross section of the sealing portion 31 becomes constant, and the leakage flow is suppressed from separating from the wall surface equivalent to the curve. And, the loss of the leakage flow due to the friction with the wall surface in the groove 70 can be increased.

As described above, since the passage cross-sectional area expands moderately at the inflow portion of the groove 70 according to the hydro turbine 103 of the fifth embodiment, the leakage flow does not separate from the wall surface equivalent to the curve ZU2 but expands while being decelerated along the wall surface. And, part of the leakage flow having flown into the groove 70 suffers loss due to collision, friction with the wall surface and the like. Thus, the sealing effect can be enhanced by increasing the loss in the sealing portion 31 by the hydro turbine 103 of the fifth embodiment. Therefore, the flow rate of the leakage flow can be decreased, and the volumetric efficiency of the hydro turbine 103 can be improved.

In the above example, the groove 70 is provided on the surface 24 of the sealing liner 22 which is a stationary portion, but the groove 70 may be formed on the surface of the runner band 15 which is a rotating portion configuring the sealing portion 31. In the above example here, the groove 70 is configured to have a continuous groove structure along the direction of the rotating shaft, but the groove 70 may be provided intermittently along the direction of the rotating shaft, namely, plural grooves 70 may be provided with prescribed intervals along the direction of the rotating shaft. In the above examples, the same action and effect as those described above can also be obtained.

(Evaluation of Loss)

It is described below that the loss can be increased by forming the groove having the above-described predetermined shape on the wall surface of the passage configuring the sealing portion 31.

To evaluate the loss, the sealing portion 31 (see FIG. 3) (specification 1) having the groove 40, the sealing portion (specification 2) having a conventional groove and the sealing portion (specification 3) not having a groove provided to the hydro turbine 10 of the first embodiment were subject to numerical analysis of flow to determine losses.

Figure 11:
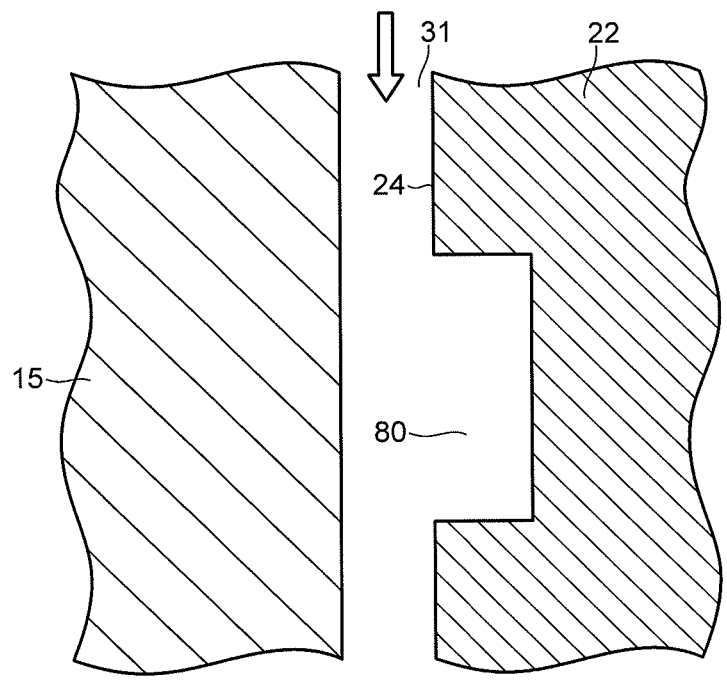
FIG. 11 is a view showing in a magnified fashion a meridional cross section of a groove portion of a sealing portion having a conventional groove.

FIG. 11 is a view showing in a magnified fashion a meridional cross section of a groove portion of a sealing portion having a conventional groove. In the conventional sealing portion shown in FIG. 11, a horizontal annular groove 80 is formed circumferentially on the surface 24 of the sealing liner 22 configuring the sealing portion 31. The groove 80 is formed into a rectangle (rectangular shape) in a meridional cross section to be perpendicular to the forming direction of the groove 80. Since the specification 3 does not have a groove, the sealing portion is configured of an annular minute gap which is formed between the runner band 15 and the sealing liner 22. It was determined that the specification 1 to the specification 3 have the same structure except that the groove portions only have different structures. And, the numerical analysis was performed on the flows.

Figure 12:
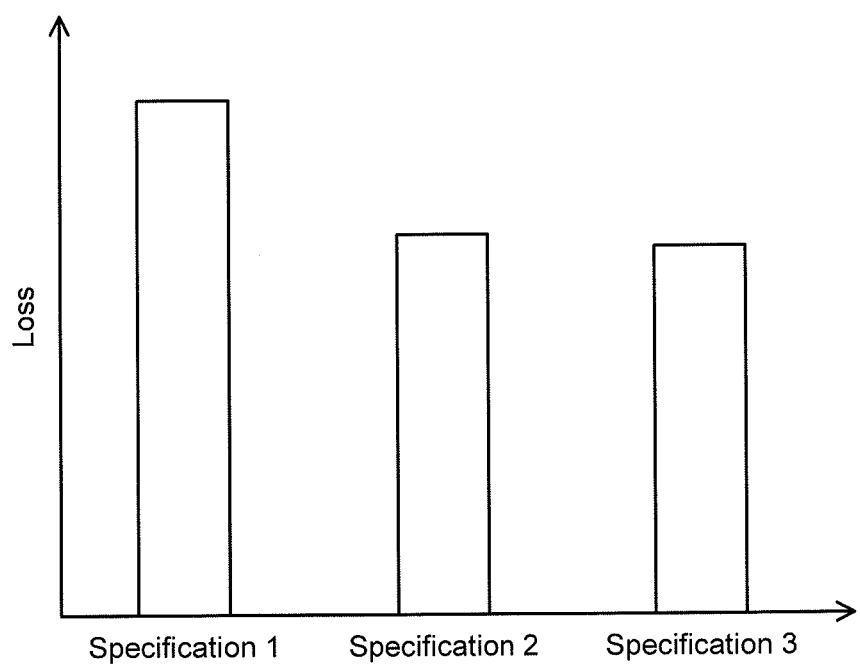
FIG. 12 is a view showing losses determined by numerical analysis of flows.

FIG. 12 is a view showing losses determined by numerical analysis of flows. It is seen from FIG. 12 that the loss in the specification 1 according to the first embodiment is larger than those in the specification 2 and the specification 3. It is not shown but the sealing portions of the other embodiments of the invention were subject to the same numerical analysis of flows as above to evaluate the losses. It was found that the losses were larger than those in the specification 2 and the specification 3.

(Evaluation of Flow)

The condition of a flow in the groove of the sealing portion according to the present embodiment was examined. And, for comparison, the condition of a flow in the groove of the sealing portion of a conventional hydro turbine was examined. The conditions of flows were determined by the numerical analysis of the flows under steady operation conditions of the hydro turbines.

As the groove of the sealing portion according to the present embodiment, the groove 40 shown in FIG. 3 was determined as a basic shape, the shape of the groove 40 in the meridional cross section was determined to be a quadrangular shape, and the side W1 adjacent to the side WU was determined to be parallel to the side W0. And, the angle θ formed between the side WU and the side W0 was determined to be 30°, and the angle α formed between the side WD and the side W0 was determined to be 90°. Meanwhile, the shape of the groove 40 in the meridional cross section in the sealing portion of the conventional hydro turbine was determined to be rectangular.

Figure 13:
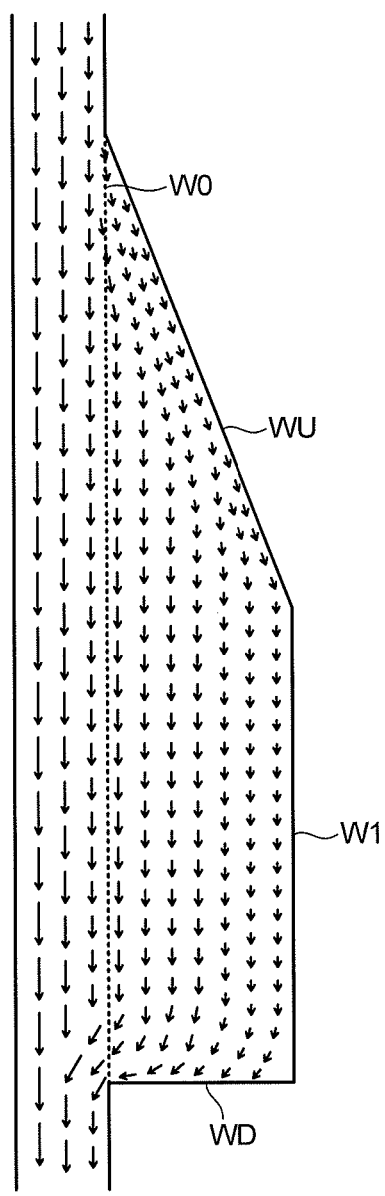
FIG. 13 is a view showing the condition of a flow in a groove portion of the sealing portion of the present embodiment.

FIG. 13 is a view showing the condition of a flow in a groove portion of the sealing portion of the embodiment.

Figure 14:
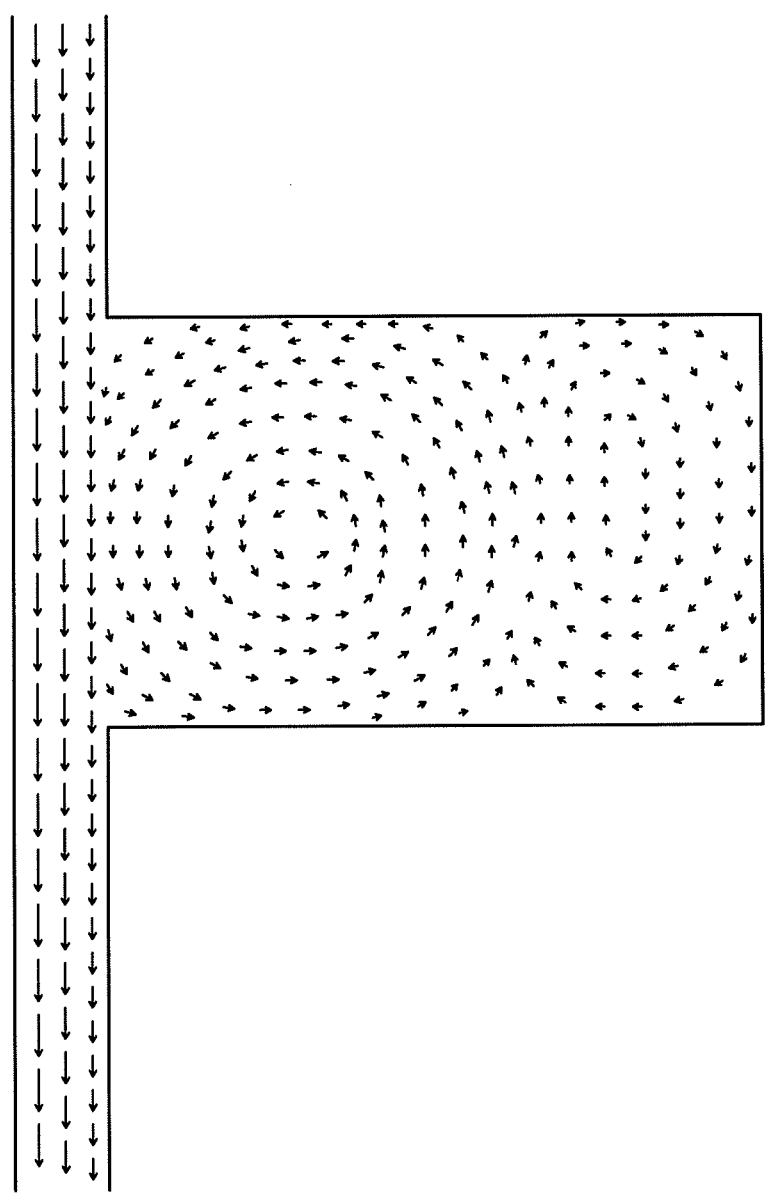
FIG. 14 is a view showing the condition of a flow in the groove portion of a sealing portion of a conventional hydro turbine.

FIG. 14 is a view showing the condition of a flow in the groove portion of a sealing portion of a conventional hydro turbine. The above results show two components of velocity vectors excluding the velocity component in a circumferential direction among the velocity components in a cylindrical coordinate system.

As shown in FIG. 13, it is seen that in the groove in the sealing portion according to the embodiment, part of the leakage flow expands along the wall surface in the groove while decelerating the velocity gradually. It is also seen that the flow is narrowed down to become a contracted flow at a region over the groove, namely at a portion where the leakage flow flowing through the sealing portion and the leakage flow from the groove interior join together.

Meanwhile, it is seen as shown in FIG. 14 that the leakage flow does not substantially enter into the groove in the sealing portion of the conventional hydro turbine, and vortex flows having a slow velocity are formed in the groove by a shear force due to the leakage flow flowing through the sealing portion.

(Evaluation of Discharge Factor of Leakage Flow)

A discharge factor of the leakage flow in the sealing portion according to the embodiment was evaluated. And, for comparison, the discharge factor of the leakage flow in the sealing portion of the conventional hydro turbine was also evaluated.

Figure 15:
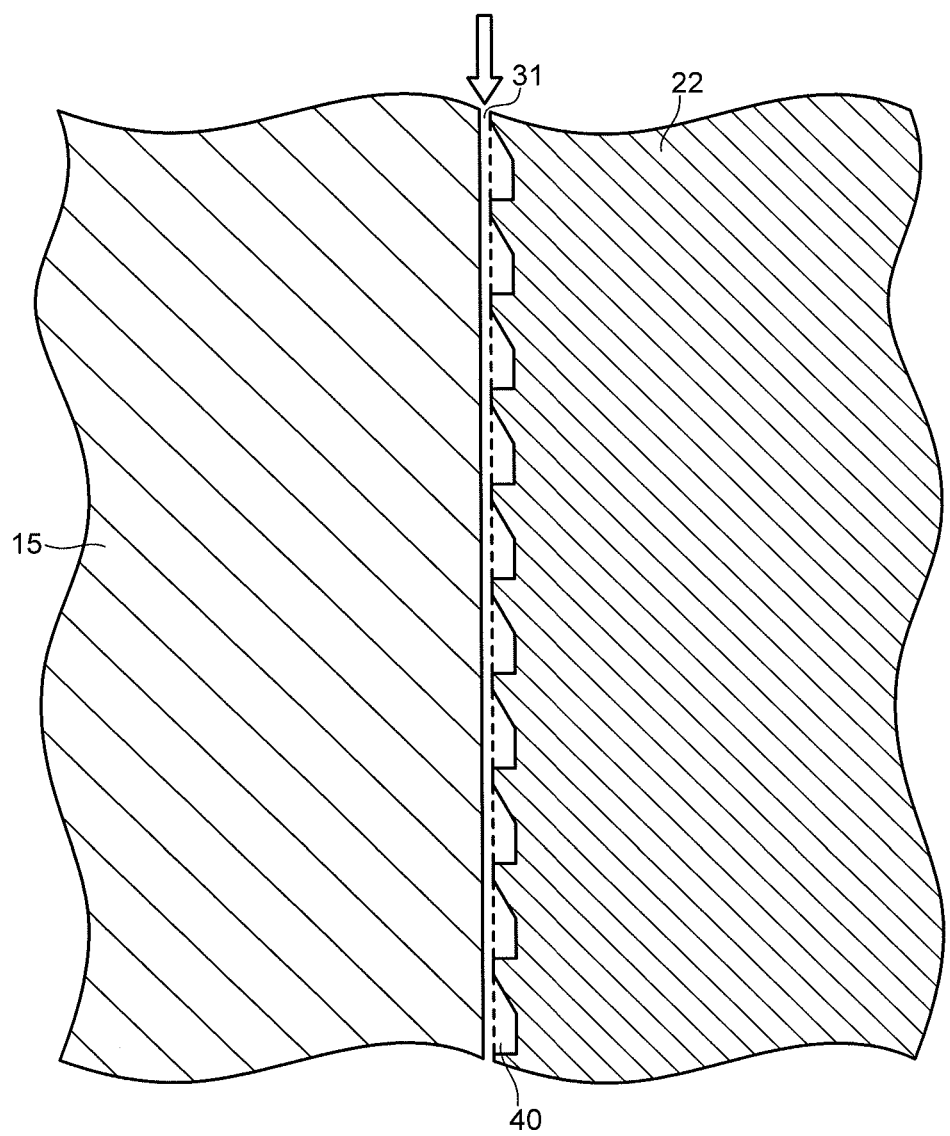
FIG. 15 is a view showing in a magnified fashion a meridional cross section of a sealing portion according to the present embodiment.
Figure 16:
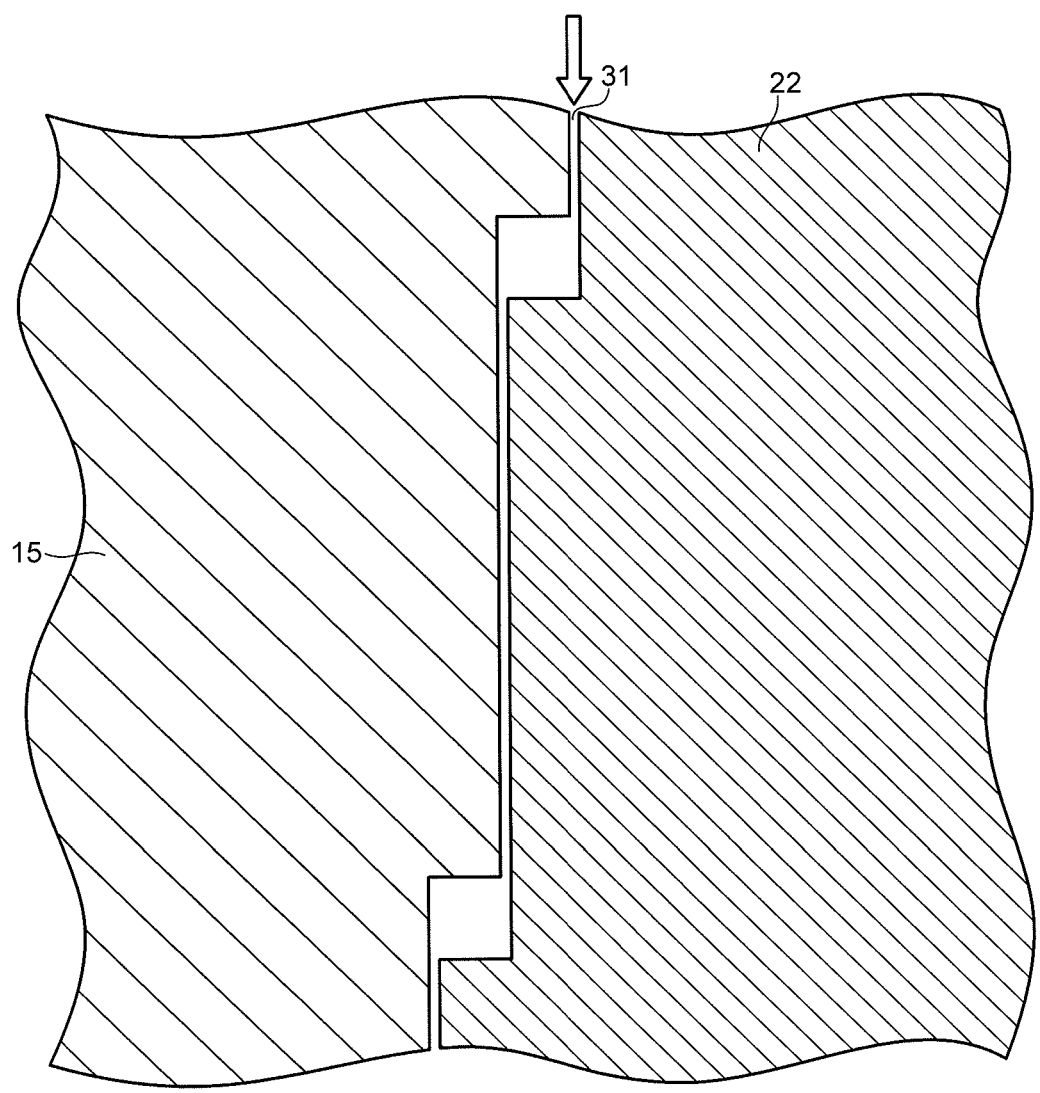
FIG. 16 is a view showing in a magnified fashion a meridional cross section of a sealing portion of a conventional hydro turbine.

FIG. 15 is a view showing in a magnified fashion a meridional cross section of a sealing portion according to the embodiment. FIG. 16 is a view showing in a magnified fashion a meridional cross section of a sealing portion of a conventional hydro turbine.

As shown in FIG. 15, the groove having the shape used for evaluation of the flow described above was formed in plural stages (19 stages) in the direction of the rotating shaft in the sealing portion according to the embodiment. And, as shown in FIG. 16, it was determined that the sealing portion of the conventional hydro turbine was configured to have a three-staged seal structure portion.

Figure 17:
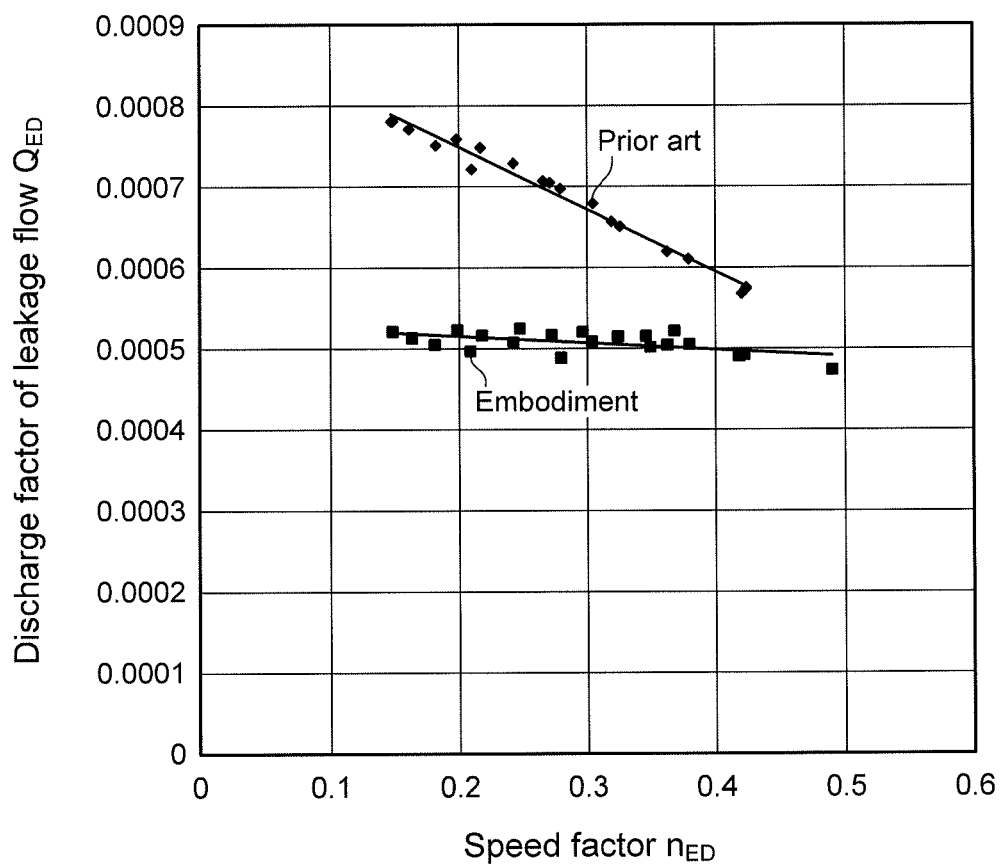
FIG. 17 is a view showing the results of measuring discharge factors of leakage flows.

FIG. 17 is a view showing the results of measuring discharge factors of leakage flows. The horizontal axis indicates a speed factor $n_{ED}$ (1.3.3.12, IEC 60193-1999), which is defined by the following equation (1). The vertical axis indicates a discharge factor $Q_{ED}$ (1.3.3.12, IEC 60193-1999) of the leakage flow, which is defined by the following equation (2).

$$n_{ED} = n \times D/E^{0.5} \quad \text{Equation (1)}$$

$$Q_{ED} = Q/(D^2 \times E^{0.5}) \quad \text{Equation (2)}$$

Here, D denotes an outlet diameter of the runner, which is determined as an outer diameter of the rotating portion as its representative dimension, n denotes a rotational speed of the rotating portion, Q denotes a volumetric flow rate of the leakage flow, and E denotes specific hydraulic energy which is hydraulic energy per unit mass of the leakage flow. And, the E is defined by the following equation (3).

$$E = g \times H \quad \text{Equation (3)}$$

Here, g denotes gravitational acceleration, and H denotes a net head.

It was found as shown in FIG. 13 that according to the sealing method of the conventional hydro turbine, the discharge factor of the leakage flow decreases with an increase in speed factor, but the discharge factor of the leakage flow according to the present embodiment does not change substantially. It was also found that according to the present embodiment, the discharge factor of the leakage flow is small, and the flow rate of the leakage flow reduces in comparison with the sealing method of the conventional hydro turbine.

According to the above-described embodiments, the loss in the sealing portion is large, so that the sealing effect is high, the flow rate of the leakage flow can be reduced, and the volumetric efficiency of the hydro turbine can be improved.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fluid machine, comprising:
   a rotating portion having a plurality of blades and an annular member disposed circumferentially at one end of the blades, the annular member having an annular wall portion;
   a stationary portion arranged in opposition to the annular member, the stationary portion having a stationary wall portion in opposition to the annular wall portion;
   a sealing portion formed of an annular minute gap between the rotating portion and the stationary portion; and
   a groove portion circumferentially formed on the annular wall portion of the annular member or the stationary wall portion of the stationary portion, the groove portion having a cross-sectional shape of an n-angled shape (n=3 or more) on a meridional cross section of the annular member, the groove portion having an angle θ from 15° to 40° formed between: a side W0 on a line of intersection of the meridional cross section and a wall surface of the annular wall portion or the stationary wall portion; and a side WU on a line of intersection of the meridional cross section and a wall surface inside the groove portion on a most upstream side with respect to a flowing direction of a leakage flow in the sealing portion,
   wherein the sealing portion includes a passage wherein the annular minute gap between the annular wall portion and the stationary wall portion has a substantially constant width except at the groove portion, the passage having a length greater than side W0, and
   wherein the annular minute gap between the annular wall portion and the stationary wall portion has a cross-sectional area expanding moderately at the groove portion.

2. The fluid machine according to claim 1,
   wherein the groove portion has an angle α being equal to or less than 90° formed between: a side WD on a line of intersection of the meridional cross section and a wall surface inside the groove portion on a most downstream side with respect to the flowing direction of the leakage flow; and the side W0.

3. The fluid machine according to claim 1,
   wherein when the side WU is determined to have a length $L_{WU}$, a value $L_{WU} \sin \theta$ is not smaller than a width value of the minute gap between the annular member and the stationary portion.

4. The fluid machine according to claim 1,
   wherein when the groove portion has an n-angled shape (n=4 or more) on the meridional cross section, a side W1 adjacent to the side WU is parallel to the side W0.

5. The fluid machine according to claim 1,
   wherein an end portion on a line of intersection of the wall surface inside the groove portion on the most upstream side with respect to the flowing direction of the leakage flow and the wall surface of the annular wall portion or the stationary wall portion adjacent to the wall surface on the most upstream-side is formed into an arc shape.

6. The fluid machine according to claim 1,
   wherein the groove portion is formed into a horizontal annular shape and in at least one stage in a direction of a rotating shaft.

7. The fluid machine according to claim 1,
   wherein the groove portion is formed helically at an inclination angle β with respect to a horizontal direction and in at least one stage in the direction of a rotating shaft.

8. The fluid machine according to claim 7,
   wherein one end of the groove portion is located on a closer position to an outlet than an inlet of the sealing portion, and another end of the groove portion is located on a closer position to the inlet than the outlet of the sealing portion.

9. The fluid machine according to claim 1,
   wherein the side WU is a convex wall surface having a curvature radius not smaller than a width value of the minute gap between the annular member and the stationary portion.

10. A fluid machine, comprising:
    a rotating portion having a plurality of blades and an annular member disposed circumferentially at one end of the blades;
    a stationary portion arranged in opposition to the annular member;
    a sealing portion formed of an annular minute gap between the rotating portion and the stationary portion; and
    at least one groove portion circumferentially formed on a wall portion of the annular member or the stationary portion, the groove portion having a shape with one curve Z0 along a surface of the wall portion in a horizontal cross section and at least two sides in the horizontal cross section, the groove portion having an angle γ from 15° to 40° formed between: a side ZU on a line of intersection of the horizontal cross section and a wall surface inside the groove portion on a most upstream side with respect to a flowing direction of a leakage flow flowing circumferentially in the horizontal cross section; and a tangent line to the curve Z0 at an intersection of the curve Z0 and the side ZU.

11. The fluid machine according to claim 10, wherein the groove portion has an angle δ being equal to or less than 90°, formed between: a side ZD on a line of intersection of the horizontal cross section and a wall surface inside the groove portion on a most downstream side with respect to the flowing direction of the leakage flow; and a tangent line to the curve Z0 at an intersection of the side ZD and the curve Z0.

12. The fluid machine according to claim 10, wherein when a length of the side ZU is determined to be $L_{ZU}$, a length of a normal line drawn from one end of the side ZU at a back of the groove to the curve Z0 is not less than a width of the minute gap between the annular member and the stationary portion.

13. The fluid machine according to claim 10, wherein an end portion on a line of intersection of the wall surface inside the groove portion on the most upstream side with respect to the flowing direction of the leakage flow and the wall surface of the wall portion adjacent to the wall surface on the most upstream-side is formed into an arc shape.

14. The fluid machine according to claim 10, wherein one end of the groove portion is located on a closer position to an outlet than an inlet of the sealing portion, and another end of the groove portion is located on a closer position to the inlet than the outlet of the sealing portion.

15. The fluid machine according to claim 10, wherein a convex wall surface having a curvature radius not smaller than a width value of the minute gap between the annular member and the stationary portion is formed instead of the wall surface equivalent to the side ZU.

* * * * *